United States Patent
Braun et al.

(10) Patent No.: US 8,131,214 B2
(45) Date of Patent: Mar. 6, 2012

(54) METHOD FOR SELECTING CONTENT FOR TRANSFER OR SYNCHRONIZATION BETWEEN DEVICES

(75) Inventors: Mark Braun, Elgin, IL (US); William Myers, Buffalo Grove, IL (US); Arnold Sheynman, Northbrook, IL (US); Vladimir Sklovsky, Northbrook, IL (US); James A. Van Bosch, Crystal Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 482 days.

(21) Appl. No.: 12/395,996

(22) Filed: Mar. 2, 2009

(65) Prior Publication Data

US 2010/0221999 A1 Sep. 2, 2010

(51) Int. Cl.
*H04B 5/00* (2006.01)
(52) U.S. Cl. ...................... 455/41.1; 455/41.2
(58) Field of Classification Search .............. 455/41.1, 455/41.2, 41.3
See application file for complete search history.

(56) References Cited

U.S. PATENT DOCUMENTS

| | | | | |
|---|---|---|---|---|
| 2006/0097983 A1* | 5/2006 | Haggman et al. | ............ | 345/156 |
| 2009/0061774 A1* | 3/2009 | Larsson et al. | ............... | 455/41.2 |
| 2009/0215397 A1* | 8/2009 | Thorn et al. | ................. | 455/41.2 |
| 2009/0256814 A1* | 10/2009 | Chung et al. | .................. | 345/173 |
| 2011/0117841 A1* | 5/2011 | Thorn et al. | ................. | 455/41.2 |
| 2011/0212688 A1* | 9/2011 | Griffin et al. | ................ | 455/41.1 |
| 2011/0230138 A1* | 9/2011 | Ohkita | ......................... | 455/41.2 |

FOREIGN PATENT DOCUMENTS

| | | |
|---|---|---|
| WO | 03/081787 A2 | 10/2003 |
| WO | 2007/034457 A1 | 3/2007 |

OTHER PUBLICATIONS

PCT Search Report mailed May 28, 2010, in Connection With Related PCT Application No. PCT/US2010/025319.

* cited by examiner

*Primary Examiner* — Lincoln Donovan
*Assistant Examiner* — William Hernandez
(74) *Attorney, Agent, or Firm* — Matthew Lopponow; Roland K. Bowler, II (57) ABSTRACT

A method, a tap initiator, and tap target in a close proximity communication are disclosed. A tap interface 106 may initiate a tap with a tap target 104. The tap interface 108 may receive a tap from a tap initiator 102. A tap gauge 110 may measure a tap duration between the tap initiator 102 and the tap target 104. A processor 304 may determine if the tap duration is within a first duration range and a second duration range and executes a first action for the first duration range and a second action for the second duration range.

17 Claims, 8 Drawing Sheets

METHOD FOR SELECTING CONTENT FOR TRANSFER OR SYNCHRONIZATION BETWEEN DEVICES

FIELD OF THE INVENTION

The present invention relates to a method and system for using a tap characteristic. The present invention further relates to using the tap duration to select an action.

INTRODUCTION

Near-field communication (NFC) may describe a short range wireless telecommunication connection based on radio frequency identifier (RFID) technology. By placing one mobile radio frequency (RF) device in close proximity to another RF device, a user may create a close proximity data connection causing the initiation of an action by one or both of the devices. Close proximity in this instance may refer to a distance of approximately less than ten centimeters. This close proximity data connection may be referred to as a "tap". The tap may be of an extremely short duration or as long as necessary to complete a task.

A user may signal to the second device that the user wishes an action to be performed when tapped by the first device. The devices may be tapped together to pair devices, to make a payment, to launch a connection over Bluetooth or WLAN, or similar actions. Different actions may be taken depending on which device the phone taps, such as a PC or payment terminal. Similarly, the second device may perform different actions if previously tapped by the first device. For example, the second device may pair with the first device using Bluetooth on the first tap and launch the Bluetooth connection on any subsequent tap.

SUMMARY OF THE INVENTION

A method, a tap initiator, and tap target in a close proximity communication are disclosed. A tap interface may initiate a tap with a tap target. The tap interface may receive a tap from a tap initiator. A tap gauge may measure a tap duration between the tap initiator and the tap target. A processor may determine if the tap duration is within a first duration range and a second duration range and executes a first action for the first duration range and a second action for the second duration range.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a tap initiator, and tap target in a close proximity communication are disclosed. A tap interface may initiate a tap with a tap target. The tap interface may receive a tap from a tap initiator. A tap gauge may measure a tap duration between the tap initiator and the tap target. A processor may determine if the tap duration is within a first duration range and a second duration range and executes a first action for the first duration range and a second action for the second duration range.

A first device may have a first thin client (TC1) active on its system, and a second device may have a second thin client (TC2) present on its system. A thin client may be a client computing device that depends on a server to perform its processing. By tapping TC1 to TC2, the active thin client may be changed from TC1 to TC2. The duration of the tap may control the extent of what is cloned from TC1 to TC2, whether a complete set or a subset. For example, a short tap may transfer a ring tone and volume setting. A longer tap may transfers a complete address book. Alternately, the number of taps within a set time span may determine the actions taken.

In multi-device system, the user may want to connect another thin client device while keeping the first thin client device. For example, TC1 may be audio-centric and TC2 may be display-centric. Alternately, the user may want to connect multiple audio-centric devices simultaneously to enable conferencing functionality. At other times, the user may want to disconnect the TC1 when a third thin client is added. For example, the user may want to change from a business thin client to a working out thin client.

The user may tap a smartphone to a personal computer PC) to synchronize. A short tap may result in only the calendar being synchronized. A longer tap may result in synchronization of the smartphone and PC calendar, address book, and media content.

For a "Smart Poster" application, the tap duration may prompt different behaviors. A "Smart Poster" may refer to an advertising display that incorporates a near-field communication (NFC) device or radio frequency identifier (RFID) tag.

A user may extract data by touching a NFC-enabled handset to the "Smart Poster". For example, a short tap may launch a uniform resource locator (URL) for the "Smart Poster". A longer tap may launch the URL and automatically add the URL to a device "Favorites List" or "Bookmark List".

The tap duration may set security credentials. For example, when a phone is tapped to the home media center with a short duration tap, the user may have minimum access such as only transferring unsecured information, such as sharing songs. The user may not be prompted for user authentication. A long tap may result in a prompt to the user to authenticate identity, such as requesting a password, biometrics, or other security measures. Upon successful authentication, the user may have full access and administrative rights.

The user may select what is transferred for a short, medium, and long tap. The user may set the time durations that correspond to a short, medium, or long tap. The device may also be pre-configured to prioritize what is transferred when the battery power is low, with only the most important things transferred first. Also, the device may transfer just a subset of the items. The tap duration timing may also be adjustable to compensate for possible timing variation of different RFID data protocols. For example, the user may set a different short tap for a contactless payment than for a "Smart Poster" application. A user may set the compensation adjustments or a manufacturer may pre-set the compensation adjustments.

Figures 1A, 1B:
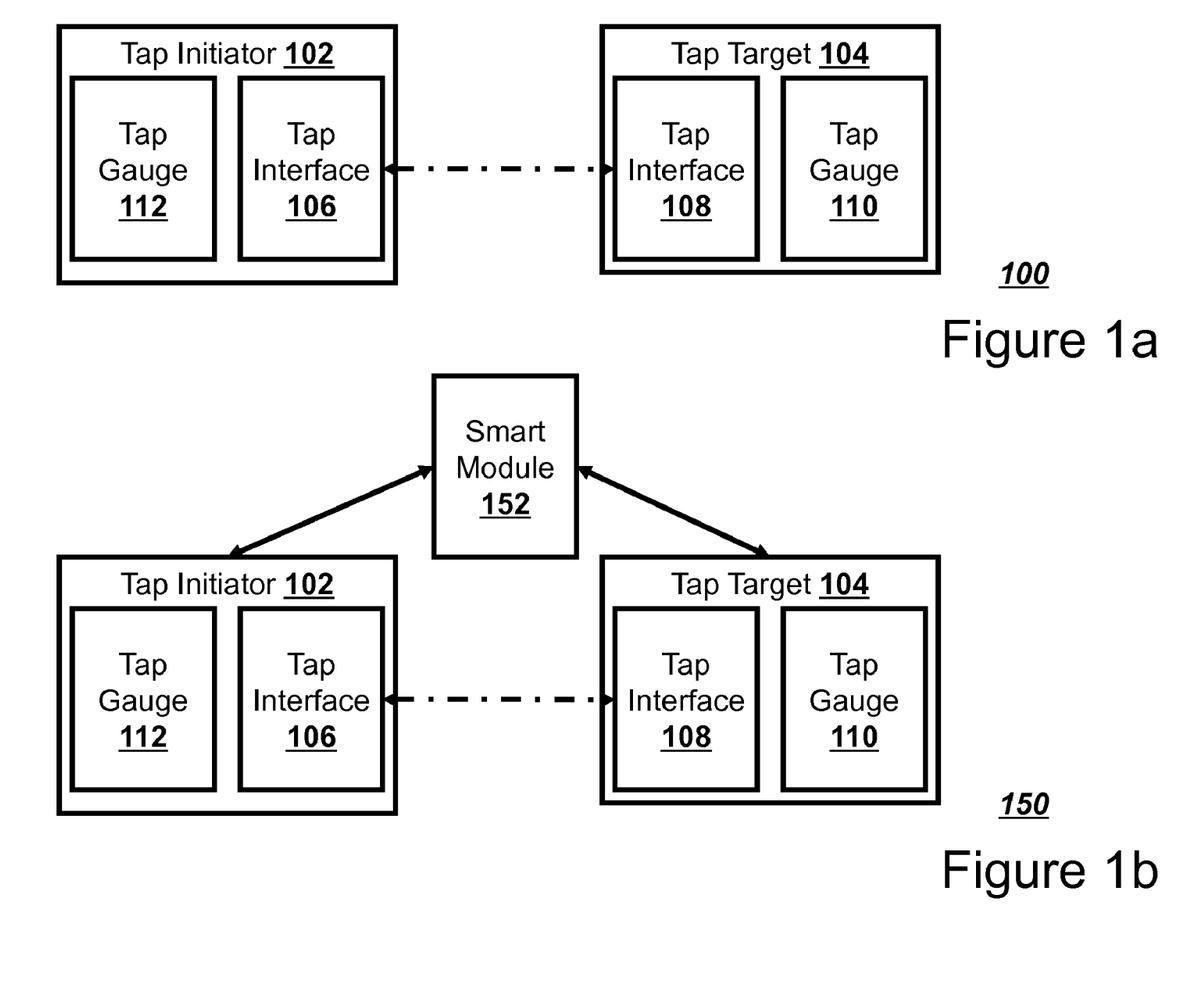
FIGS. 1a-b illustrate in block diagrams alternate embodiments of a tap.

FIG. 1a illustrates in a block diagram one embodiment of a tap 100. A tap initiator 102 may initiate a tap connection with a tap target 104. The tap initiator 102 and the tap target 104 may be NFC devices or mobile devices. The tap interface 106 of the tap initiator 102 may create a connection with the tap interface 108 of the tap target 104. The tap target 104 may have a tap gauge 110 to monitor the duration of the tap from the other end. The tap gauge 110 may be a timer tracking the duration of the RFID field or a counter that counts the number of messages between the two devices. The tap initiator 102 may have a tap gauge 112 to monitor the duration of the tap. The tap gauge 112 may be a counter that counts the number of messages between the two devices.

FIG. 1b illustrates, in a block diagram, an alternate embodiment of a tap 150. A tap initiator 102 or tap target 104 may depend on a server 152, or smart module 152, to perform its processing. The tap initiator 102 and the tap target 104 may be connected to the smart module 152 either directly or via a network. The smart module 152 may monitor the tap 150 via either the tap initiator 102 or the tap target 104. The smart module 152 may use the tap duration to choose whether or not to disconnect from the tap initiator 102. A short tap may connect the tap target 104 to the smart module 152 while keeping the tap initiator 102 connected. A long tap may connect the tap target 104 and disconnect the tap initiator 102.

Figure 2:
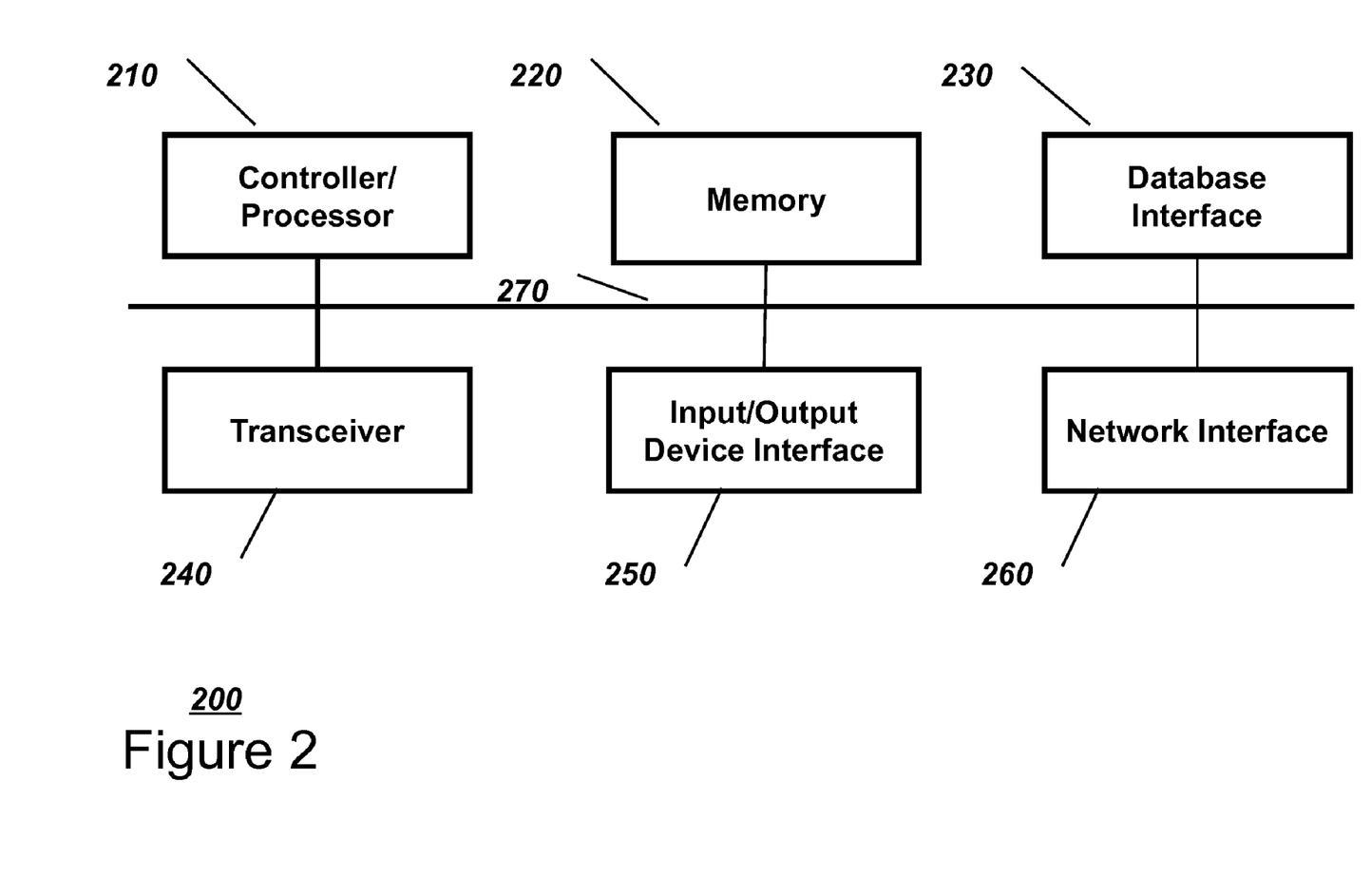
FIG. 2 illustrates a possible configuration of a computing system to act as a tap target.

FIG. 2 illustrates a possible configuration of a computing system 200 to act as a smart module 152. The computing system 200 may include a controller/processor 210, a memory 220, a database interface 230, a transceiver 240, input/output I/O) device interface 250, and a network interface 260, connected through bus 270. The computing system 200 may implement any operating system. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM, digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain any formatting data to transmit data between the tap initiator 102 and the tap target 104.

The transceiver 240 may create a data connection create a connection with the tap initiator 102 and the tap target 104. The transceiver 240 may be incorporated into the network server or may be a part of a base station connected to the computing system 200.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network. The network connection interface 260 may be used to connect a client device to a network. The network connection interface 260 may be used to connect the teleconference device to the network connecting the user to other users in the teleconference. The components of the computing system 200 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The computing system 200 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
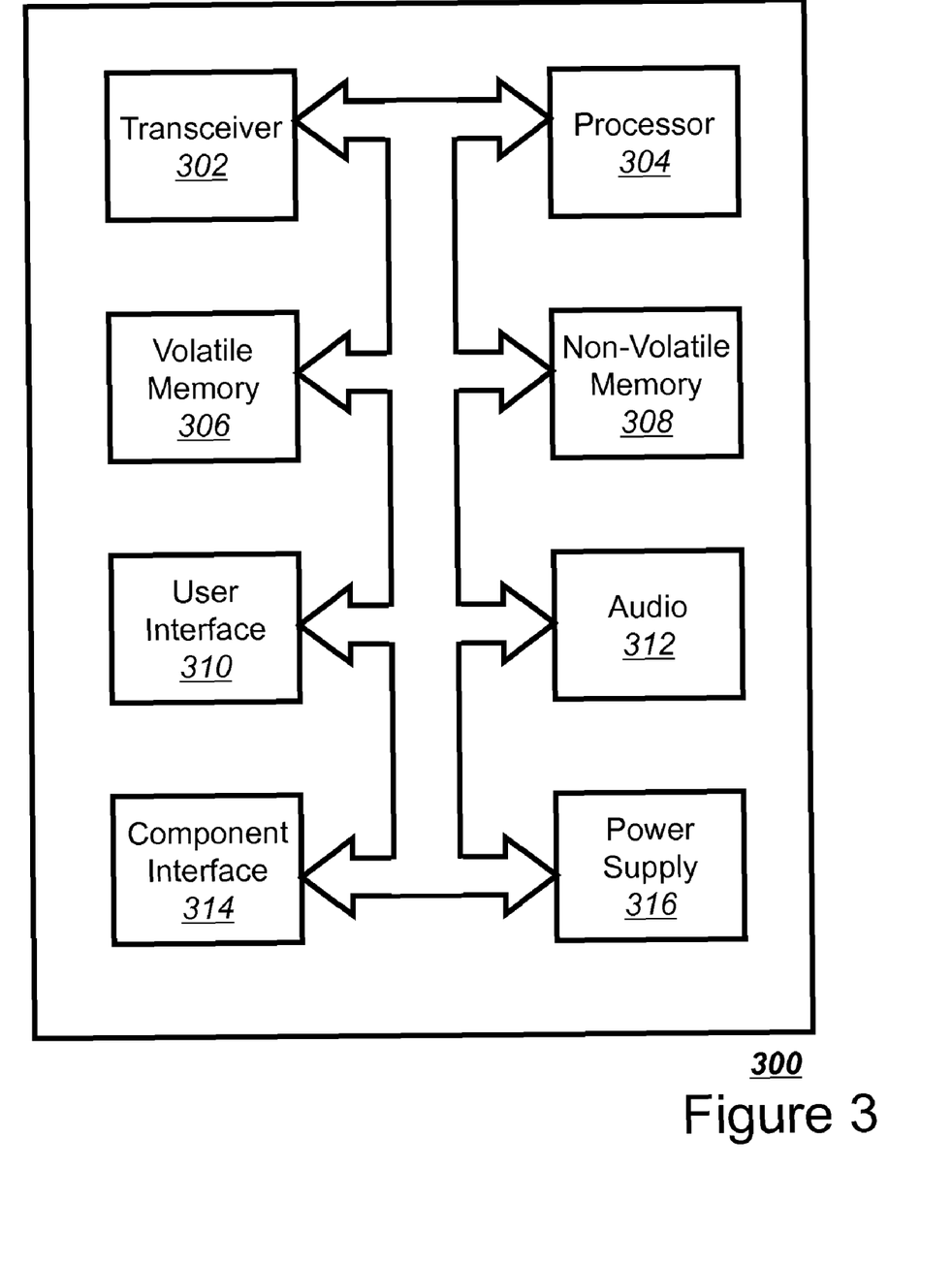
FIG. 3 illustrates in a block diagram one embodiment of a mobile device to act as a tap initiator.

FIG. 3 illustrates one embodiment of a mobile device 300, or terminal, capable of acting as tap initiator 102 or a tap target 104. The mobile device 300 may be capable of accessing the information or data stored in the smart module 152. For some embodiments of the present invention, the mobile device 300 may also support one or more applications for performing various communications with a network. The mobile device 300 may be a handheld device, such as, a mobile phone, a laptop, or a personal digital assistant (PDA). For some embodiments of the present invention, the user device 300 may be WiFi® capable device, which may be used to access the network mobile for data or by voice using VOIP.

The mobile device 300 may include a transceiver 302, which is capable of sending and receiving data over a network. The mobile device 300 may include a processor 304 that executes stored programs. The mobile device 300 may also include a volatile memory 306 and a non-volatile memory 308 which are used by the processor 304. The mobile device 300 may include a user input interface 310 that may comprise elements such as a keypad, display, touch screen, and the like. The mobile device 300 may also include a user output device that may comprise a display screen and an audio interface 312 that may comprise elements such as a microphone, earphone, and speaker. The mobile device 300 also may include a component interface 314 to which additional elements may be attached, for example, a Bluetooth® interface circuit or a NFC interface circuit. Finally, the mobile device 300 may include a power supply 316.

Figure 4:
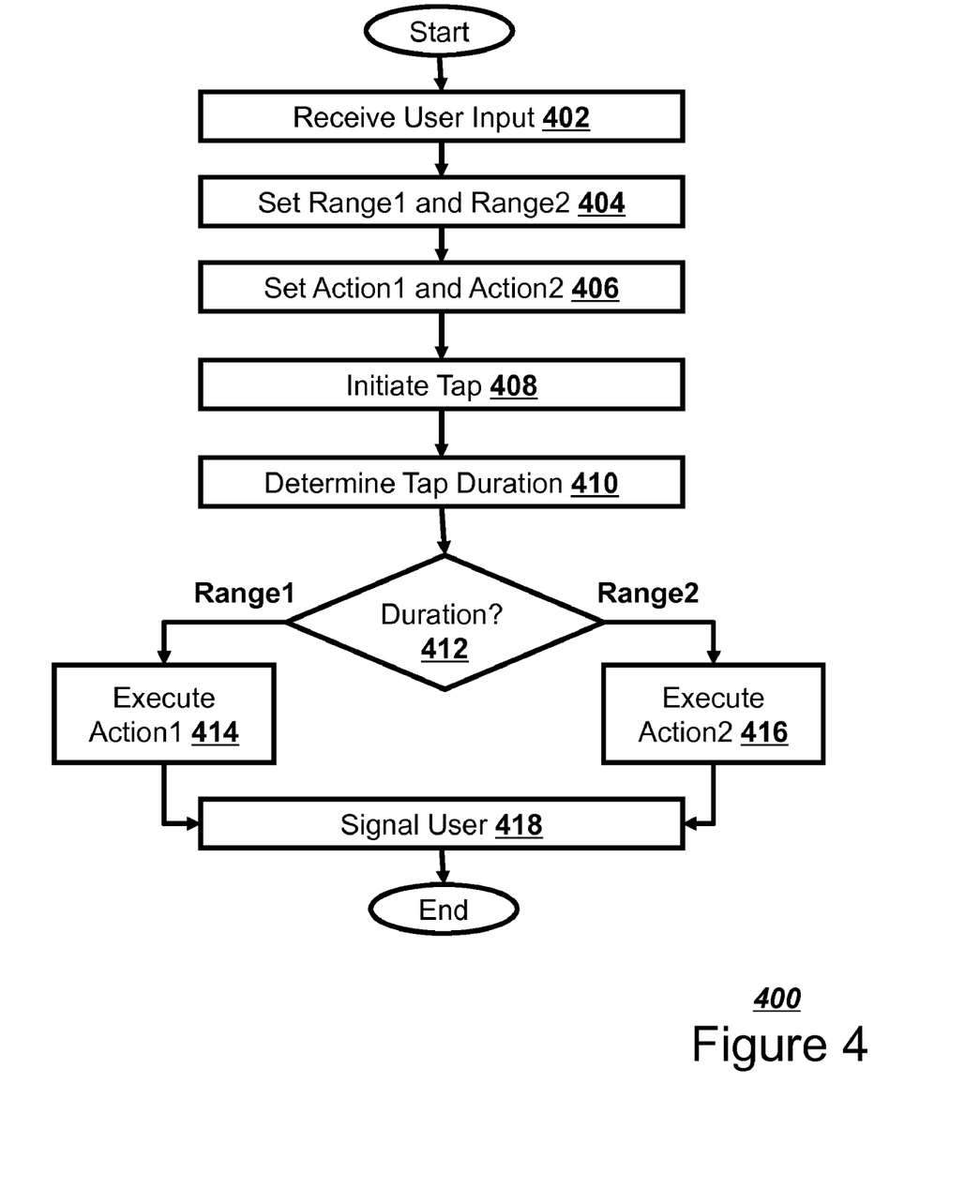
FIG. 4 illustrates, in a flowchart, one method of selecting an action with a tap initiator based on tap duration.

FIG. 4 illustrates one method 400 of selecting an action with a tap initiator 102 based on tap duration. At a time prior to the tap but not necessarily near in time to the tap, the tap initiator 102 may receive a set of instructions input by the user relating to actions to be performed during the tap (Block 402). These set of instructions may select which tap characteristic, such as duration or number of taps in a time period, may be used to differentiate between the actions. The set of instructions may identify which action corresponds to which range of characteristics. For example, the tap initiator 102 may set the first duration range and the second duration range based on the user input (Block 404). The tap initiator 102 may set a first action associated with the first duration range and a second action associated with a second duration range (Block 406). Alternately, the tap initiator 102 may rely on default settings. Once the actions have been established, the tap initiator 102 may initiate the tap with the tap target 104 (Block 408). The tap initiator 102 may determine the tap duration (Block 410). The tap initiator 102 may determine the tap duration by counting the tap messages from the tap target 104, by receiving a notification from the tap target 104, or by other techniques. If the tap duration is in the first range (Block 412), the tap initiator may execute the first action (Block 414). If the tap duration is in the second range (Block 412), the tap initiator may execute the second action (Block 416). Once the action has been selected, the tap initiator 102 may signal the user upon the selection (Block 418).

Figure 5:
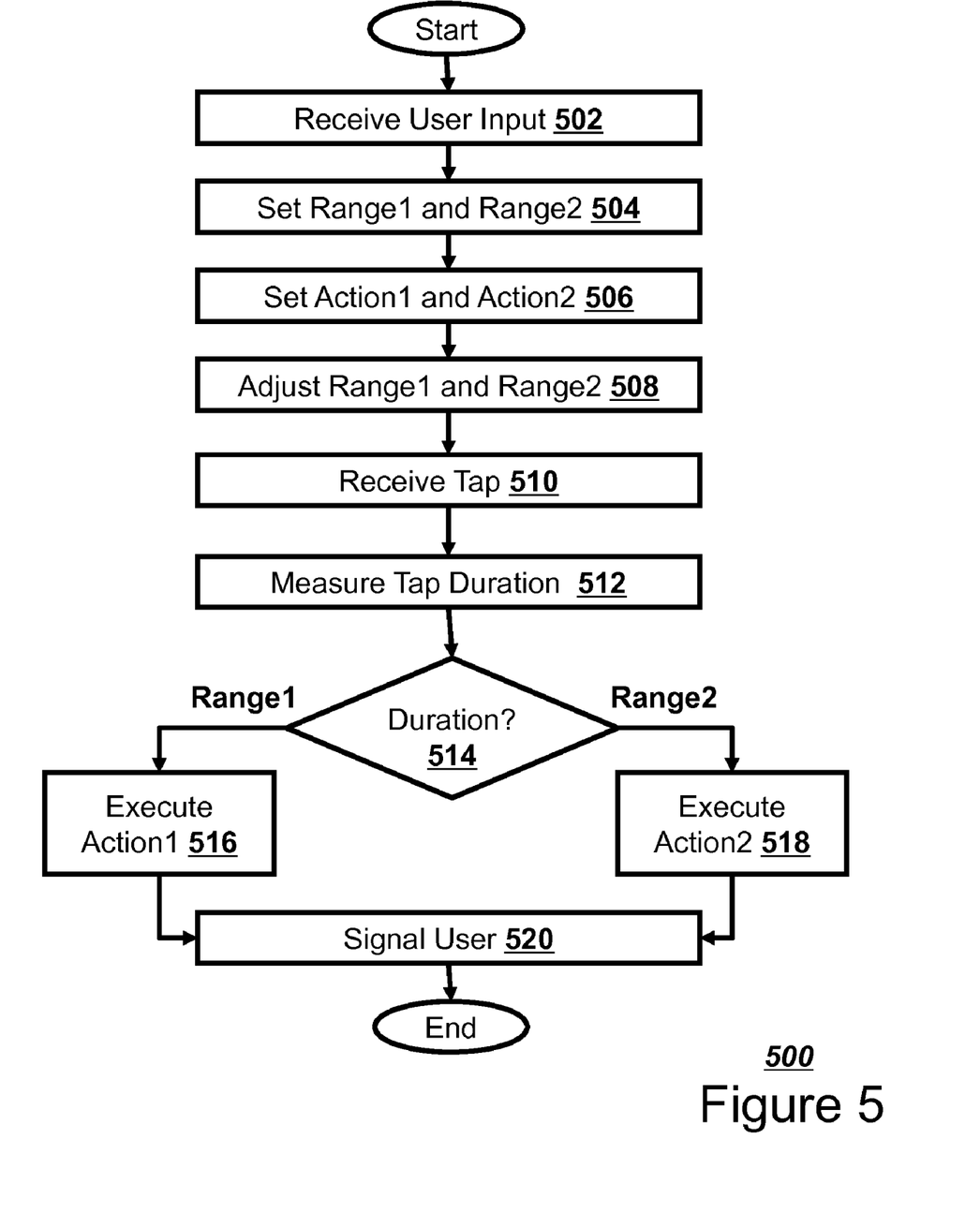
FIG. 5 illustrates, in a flowchart, one method of selecting an action with a tap target based on tap duration.

FIG. 5 illustrates one method 500 of selecting an action with a tap target 104 based on tap duration. The tap target 104 may receive a set of instructions input by the user relating to actions to be performed during the tap (Block 502). The tap target 104 may set the first duration range and the second duration range based on the user input (Block 504). The tap target 104 may set a first action associated with the first duration range and a second action associated with a second duration range (Block 506). The tap target 104 may adjust the first duration range and the second duration range to compensate for a NFC or RFID timing deviation of transmission protocols (Block 508). Once these actions have been established, the tap target 104 may receive a tap attempt from a tap initiator 102 (Block 510). The tap target 104 may measure the tap duration (Block 512). If the tap duration is in the first range (Block 514), the tap initiator may execute the first action (Block 516). If the tap duration is in the second range (Block 514), the tap initiator may execute the second action (Block 518). Once the action has been selected, the tap target 104 may signal the user upon the selection (Block 520).

The device may provide user feedback on the transfer. For example, tap target 104 may beep if the tap is long enough to trigger the first action, such as the transfer of a first data set, and may beep again when the tap is long enough to trigger the second action, such as the transfer of a second data set. The second beep may have a different tone, frequency, or duration than the first beep. A display may show what action or actions are triggered. A progress bar or description of the triggered actions may be shown. Alternatively, the device may vibrate to indicate a tap has taken place.

The selected data transport may also depend on the battery level. For low battery situations, the tap target 104 may choose to transfer only critical data. Even if multiple data transmission protocols are prescribed, the tap target 104 may choose to transfer exclusively over NFC if the battery power is low. The transfer may be partially powered by the other device through the NFC field. The devices may select the role or initiator or target based on battery level.

While the trigger for the different action may be a NFC tap of varying durations, multiple approaches may be used to actually transfer content data between the devices. In one approach, the duration of the tap may determine what data to transfer. The actual data transfers may occur using an existing data transmission protocol, such as NFC, as the devices are held in proximity of each other. During the first time interval of the tap, the tap initiator 102 may send the first piece of data. During the second time interval of the tap, the tap initiator 102 may send the next piece of data. If the tap duration is determined by the number of messages, those messages may exchange the data between the devices.

In a second approach, the duration of the tap may determine what data to transfer. That actual data transfer may occur over a second communication channel, such as Bluetooth. Bluetooth may be particularly advantageous for large data transfers, where keeping the devices in NFC proximity for the duration of the transfer may be impractical.

A third approach may be a hybrid of the first two approaches. The duration of the tap may determine what data to transfer. If a small data set is to be transferred, the tap initiator 102 may execute a first data transfer over a first data transmission protocol, such as NFC. If a large data set is to be transferred, then the tap initiator 102 may execute a second data transfer over a second data transmission protocol, such as Bluetooth. The tap initiator 102 may also start the data transfer using NFC and complete the data transfer over Bluetooth if needed, such as if the devices are removed from NFC range before completion of the data transfer. Both segments may use the same data transmission protocol, or different data transmission protocol.

Figure 6:
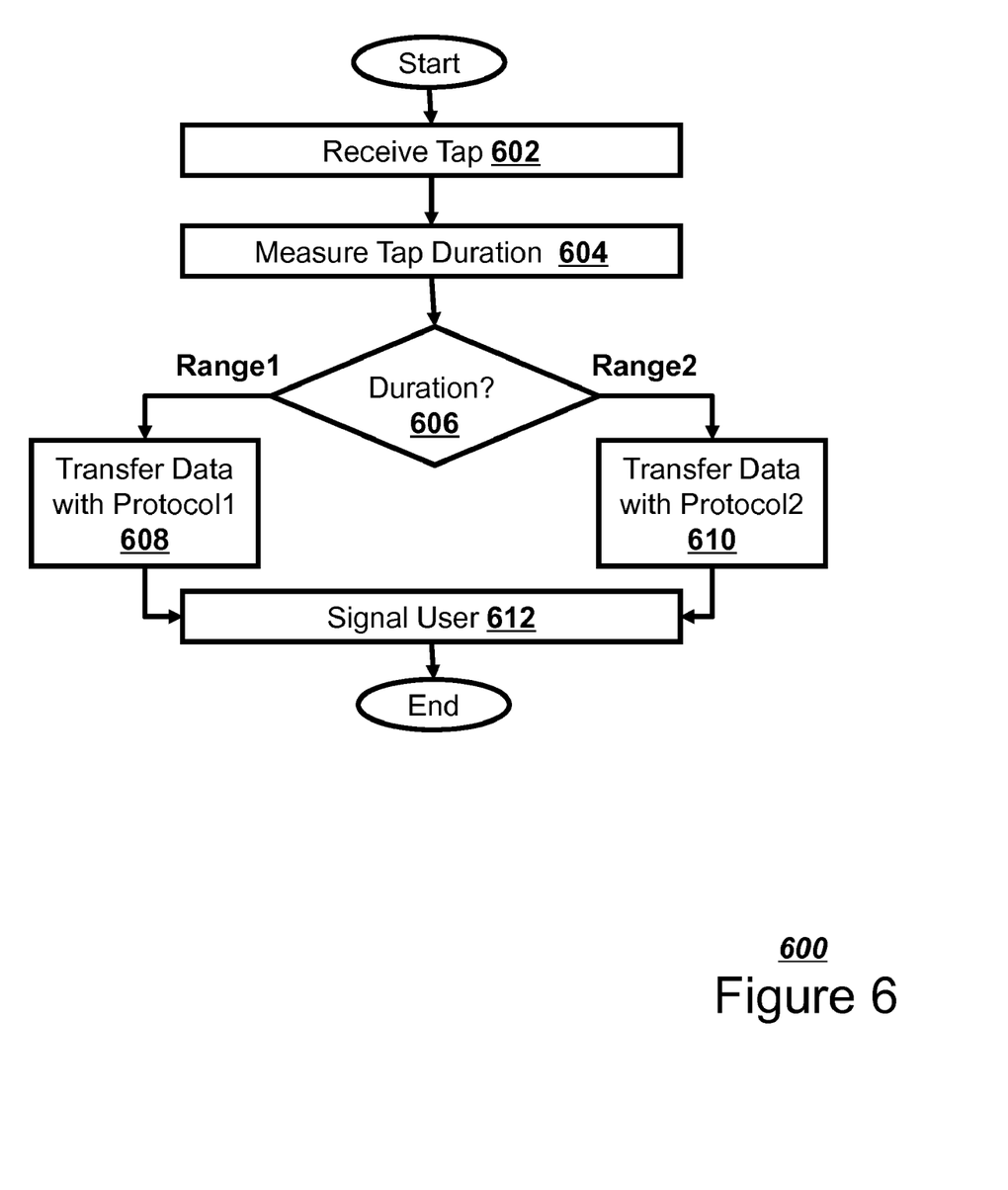
FIG. 6 illustrates, in a flowchart, one method of selecting a data transmission protocol based on tap duration.

FIG. 6 illustrates one method 600 of selecting a data transmission protocol based on tap duration. For instance, a first duration range may be associated with a NFC data transfer and a second duration range may be associated with a Bluetooth data transfer. Other data transmission protocols, such as WiFi, WiMax, or Transferjet, may be used as well. The tap target 104 may initiate the tap with the tap target 104 (Block 602). The tap target 104 may measure the tap duration (Block 604). If the tap duration is in the first range (Block 606), the tap target 104 may transfer data using the first data transmission protocol, or NFC (Block 608). If the tap duration is in the second range (Block 610), the tap target 104 may transfer data using the second data transmission protocol, Bluetooth. (Block 612). Once the action has been selected, the tap target 104 may signal the user upon the selection (Block 614).

The tap initiator 102 or tap target 104 may use a number of approaches to determine the duration of the tap. In one approach, a thin client may send periodic messages from the initiator and track the number of messages received at the target and the number of responses received at the initiator. In a second approach, a tap target 104 may measure the time the RFID field is present or another parameter indicating device proximity. The tap target 104 may alert the tap initiator 102 to the tap duration after performing the measurement.

Figure 7:
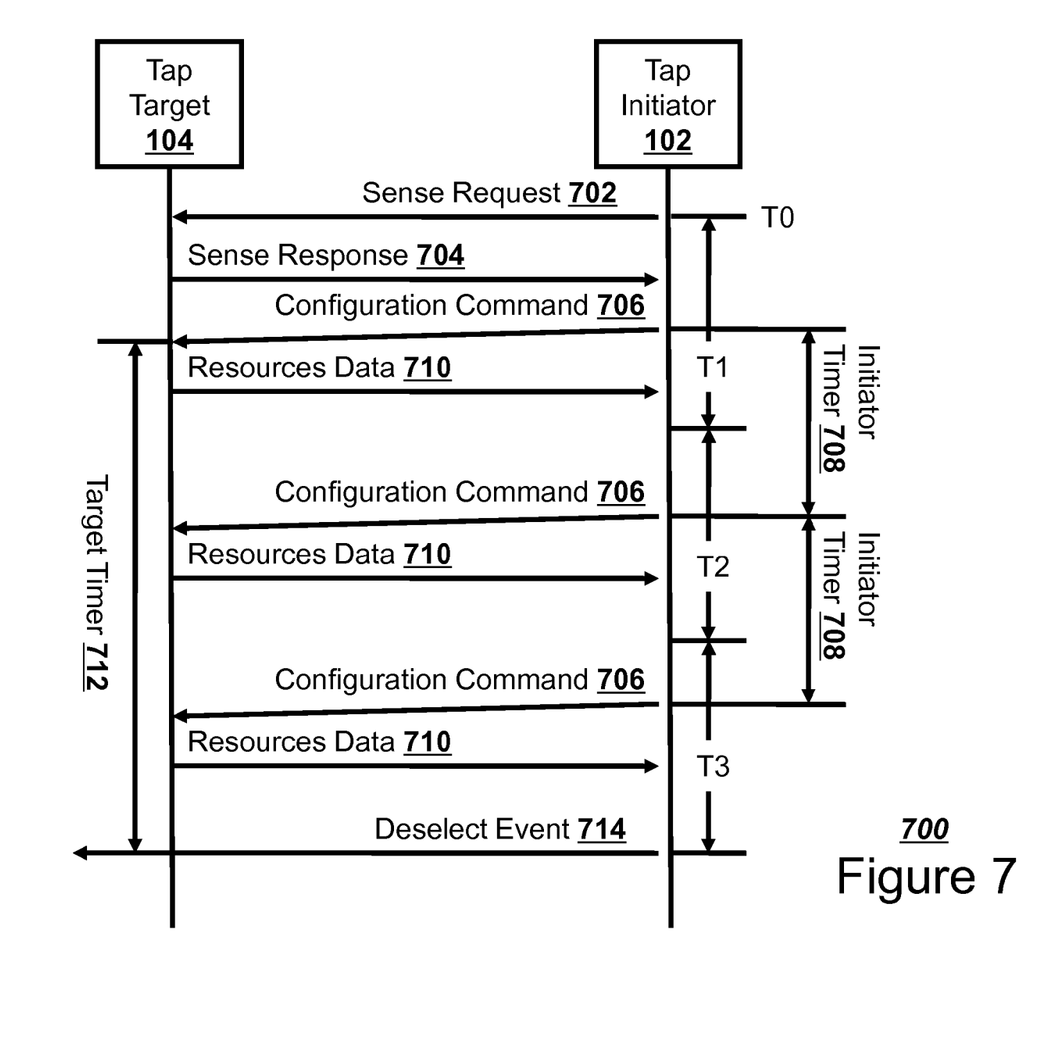
FIG. 7 illustrates, in a block flow diagram, one embodiment of a method for using a counter to measure tap duration.

FIG. 7 illustrates one embodiment of a method 700 for using a counter to measure tap duration. A tap initiator 102 may generate an RFID field and periodically send a sense request 702 to the tap target 104. When tap target 104 is brought into proximity of tap initiator 102, the tap target 104 may respond by sending a sense response 704 to the tap initiator 102.

After receiving this confirmation, the tap initiator 102 may begin sending a configuration command set 706 to the tap target 104 at regular intervals. The configuration command set 706 may be one frame or several. The tap initiator 102 may start the internal initiator timer 708 upon sending the first configuration command set 706. The duration of initiator timer 708 may be in range of 200-500 ms, in order to correspond with human ability to tap the different duration times. The range may be adjustable. The next configuration command set 706 may start upon expiration of the initiator timer 708 event, and initiator timer 708 may restart. The tap initiator 102 may repeat this sequence for subsequent exchanges. The time interval of configuration command set exchange between the tap initiator 102 and the tap target 104 may usually take less than 10-50 ms, even for several frames transfer in a one configuration set.

The configuration command set 706 data may be the same for all three time frames, but the tap target 104 may decode each differently. The configuration command set 706 may include the code data for the configuration, in case the tap target 104 receives only the first configuration command set 706. In case a second or third configuration command set 706 are received, the tap target 104 may decode the data differently, in accordance with a configuration algorithm.

The tap initiator 102 may determine configuration based on the number of received resource data sets 710 from the tap target 104. The tap target 104 may determine configuration based on the number of received configuration command set 706 sets from the tap initiator 102 within a time set determined by target timer 712. The tap target 104 may start the target timer 712 upon receiving the first configuration command set 706 from the tap initiator 102. The target timer 712 may stop based on a radio frequency deselect event 714.

For example, a phone, the tap initiator 102, may be tapped to a PC, the tap target 104. In a simplified example, if one configuration command set 706 is received by the PC, the tap duration may be short and the PC may synchronize just the calendar with the phone. If two configuration command sets 706 are received by the PC, the tap duration may be of medium length and the PC may synchronize the calendar and the contact list with the phone. If three configuration command sets 706 are received by the PC, the tap duration may be long and the PC may synchronize all the data with the phone.

Based on a handshaking procedure, a tap connection may allow the exchange of data between the two devices, with feedback response, in the form of a resource data set 710, from the tap target 104. The tap initiator 102 may monitor the exact data received by the tap target 104. A configuration command set may allow this device to distinguish this exchange from a data exchange like a Smart Poster. The transfer may be done over RFID or NFC.

Figure 8:
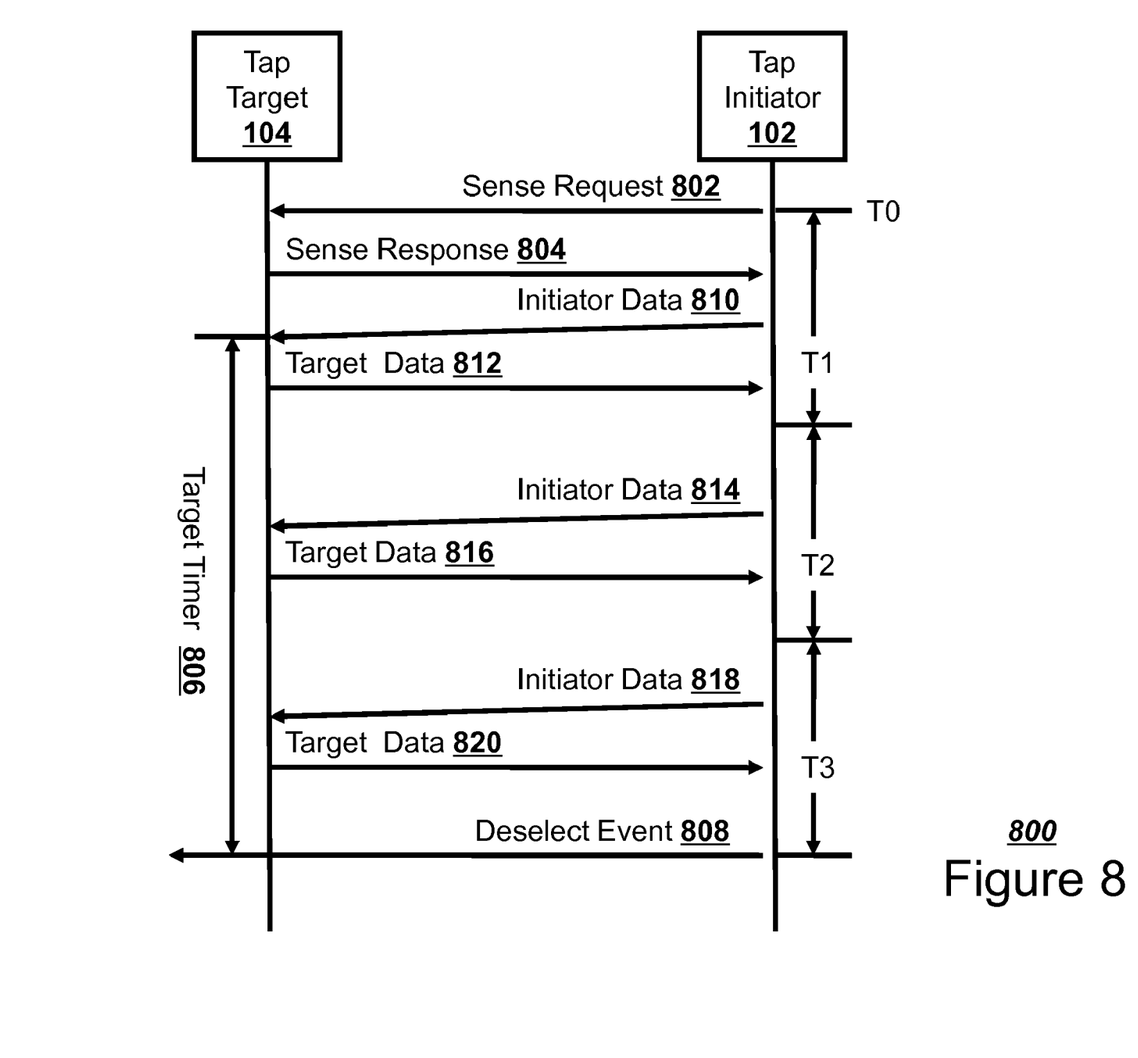
FIG. 8 illustrates, in a block flow diagram, one embodiment of a method for using a timer to measure a tap duration.

FIG. 8 illustrates one embodiment of a method 800 for using a timer to measure a tap duration based on a RFID field presence duration. At the beginning of the tap, a tap initiator 102 may send a sense request 802 to the tap target 104. The tap target 104 may confirm by sending a sense response 804 to the tap initiator 102. The tap target 104 may start the target timer 806 upon detecting the RFID field. The tap target 104 may wait to start the target timer 806 until receiving the first data from the tap initiator 102. At the end of the tap, when the tap target 104 leaves the proximity of the tap initiator 102, the tap target 104 may detect the RFID field termination by detecting a radio frequency (RF) field deselect event 808. The deselect event 808 may stop the target timer 806. The time interval may determine the chosen configuration.

As the devices are held in proximity, information may be transferred during discrete intervals. For a short tap duration, the tap initiator 102 may transfer a first set of initiator data 810 to the tap target 104. The tap target may confirm receipt of the first set of initiator data 810 with a first set of target data 812. For a medium tap duration, the tap initiator 102 may transfer a second set of initiator data 814 to the tap target 104. The tap target may confirm receipt of the second set of initiator data 814 with a second set of target data 816. For a long tap duration, the tap initiator 102 may transfer a third set of initiator data 818 to the tap target 104. The tap target may confirm receipt of the first set of initiator data 818 with a third set of target data 820. Some debouncing may prevent detecting a long tap as two shorter taps due to unintentional movement of the hand. The user may be given a warning signal upon loss of the RFID field. The user may then have a limited time to return the device to the RFID field. If the RFID field is again detected within the time limit, the devices may discard bad packets and the devices may resume communication.

By measuring the presence of the RFID field, the target device may monitor the tap duration. The tap initiator 102 may generate the RFID field, in which case the tap initiator 102 may not simply measure RFID field presence to detect the tap duration. The tap initiator 102 and tap target 104 may use alternate approaches to determine device proximity and the duration of tap. For example, the device may determine the presence of a secondary coil by monitoring a secondary parameter such as change in inductance.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium.

Combinations of the above should also be included within the scope of the computer-readable media.

Embodiments may also be practiced in distributed computing environments where tasks are performed by local and remote processing devices that are linked (either by hardwired links, wireless links, or by a combination thereof through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for selecting a communication action, comprising:
    measuring a tap duration between a tap initiator and a tap target;
    determining if the tap duration is within a first duration range and a second duration range;
    executing a first action for the first duration range and a second action for the second duration range; and
    setting the first duration range and the second duration range based on user input.

2. The method of claim 1, wherein the tap initiator and the tap target are near-field communication devices.

3. The method of claim 1, further comprising:
    determining the tap duration using a timer to measure a radio frequency identifier field presence duration.

4. The method of claim 1, further comprising:
    determining the tap duration using a counter to count messages between the tap initiator and the tap target.

5. The method of claim 1, further comprising:
    adjusting the first duration range and the second duration range to compensate for a timing deviation of a transmission protocol.

6. The method of claim 1, further comprising:
    setting the first action and the second action based on user input.

7. The method of claim 1, wherein the first action is a first data transfer using a first data transmission protocol and the second action is a second data transfer using a second data transmission protocol.

8. The method of claim 1, further comprising:
    signaling a user upon selecting between the first action and the second action.

9. A tap target in a close proximity communication, comprising:
    a tap interface to receive a tap from a tap initiator;
    a tap gauge that measures a tap duration between the tap initiator and the tap target;
    a processor that determines if the tap duration is within a first duration range and a second duration range and executes a first action for the first duration range and a second action for the second duration range; and
    a user interface that receives a user input to set the first duration range, the second duration range, the first action, and the second action.

10. The tap target of claim 9, wherein the tap gauge is a timer to measure a radio frequency identifier field presence duration.

11. The tap target of claim 9, wherein the tap gauge is a tap message counter to count messages from the tap initiator.

12. The tap target of claim 9, wherein the first action is a first data transfer using a first data transmission protocol and the second action is a second data transfer using a second data transmission protocol.

13. The tap target of claim 9, further comprising:
    a transceiver that alerts the tap initiator to signal a user upon selecting between the first action and the second action.

14. A tap initiator in a close proximity communication, comprising:
    a tap interface to initiate a tap with a tap target;
    a tap gauge that measures a tap duration between the tap initiator and the tap target;
    a processor that determines if the tap duration is within a first duration range and a second duration range and executes a first action for the first duration range and a second action for the second duration range; and
    a user interface that receives a user input to set the first duration range, the second duration range, the first action, and the second action.

15. The tap initiator of claim 14, wherein the tap gauge is a tap message counter to count messages from the tap initiator.

16. The tap initiator of claim 14, wherein the first action is a first data transfer using a first data transmission protocol and the second action is a second data transfer using a second data transmission protocol.

17. The tap initiator of claim 14, further comprising:
    an output that signals to a user upon selecting between the first action and the second action.

* * * * *